United States Patent [19]

Clark

[11] Patent Number: 5,031,192

[45] Date of Patent: Jul. 9, 1991

[54] SYNTHETIC DEMODULATION OF SPREAD SPECTRUM SIGNALS

[75] Inventor: Robert W. Clark, Centerville, Ohio

[73] Assignee: United States of America as Represented by the Secretary of the Air Force, Washington, D.C.

[21] Appl. No.: 474,602

[22] Filed: Feb. 5, 1990

[51] Int. Cl.[5] ...................... H04L 27/30; H04L 27/06

[52] U.S. Cl. .......................................... 375/1; 375/80; 375/96

[58] Field of Search .............................. 375/1, 80-82, 375/94-96; 380/31, 33, 49, 50, 48, 34

[56] References Cited

U.S. PATENT DOCUMENTS

| | | | |
|---|---|---|---|
| 4,164,628 | 8/1979 | Ward et al. | 370/93 |
| 4,320,513 | 4/1982 | Lampert | 375/1 |
| 4,447,907 | 5/1984 | Bjornholt et al. | 375/1 |
| 4,644,523 | 2/1987 | Horwirz | 370/18 |
| 4,730,340 | 3/1988 | Frazier, Jr. | 375/1 |
| 4,763,357 | 8/1988 | Barr | 380/48 |

*Primary Examiner*—Bernarr E. Gregory
*Attorney, Agent, or Firm*—Bernard E. Franz; Donald J. Singer

[57] ABSTRACT

This is a spread spectrum radio frequency (RF) communication system whose purpose is to "spread" the information bandwidth such that when it is de-spread any atmospheric interference (including jamming is spread rather than de-spread. A "low probability of exploitation" is obtained through the use of multiple modulations each of which creates a distinct spread spectrum symbol at the transmitter, and the reception of which requires a "match" condition at the receiver to determine the data bit state. The symbol sequence is known by the appropriate receivers and the collection of data bits forms a message.

3 Claims, 13 Drawing Sheets

$S(t) = B(t) \cdot \cos\omega_c t$ $y(t) = S(t) \cdot 2\cos\omega_c t$ $y(t) = (B(t)\ (\cos\omega_c t) \cdot 2\cos\omega_c t$ $y(t) = B(t) + B(t) \cdot \mathrm{Cos}2\omega_c t$ BPF BAND PASS FILTER
LPF LOW PASS FILTER
I/D INTEGRATE / DUMP
S / H SAMPLE / HOLD
T THRESHOLD DETECTOR "i" RECOVERED DATA DELAYED ONE SYMBOL TIME

SYNTHETIC DEMODULATION OF SPREAD SPECTRUM SIGNALS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to command, control and communications systems, and more particularly to a technique for the acquisition, synchronization, and recovery of coherently coded and combined spread spectrum symbol formats.

With the continuing development of sophisticated command, control, and communication data processing systems, spread spectrum communication techniques have drawn particular attention because of a number of advantages they offer over more conventional and limited bandwidth modulation schemes. One advantage is the capability of enabling the communication link to exhibit a robustness against jamming or natural interfering signals which are not correlated with the particular spreading waveform. These interference signals may include jamming, randomly distributed natural events, or other users of the same spectrum. A further advantage is that a signal-to-noise improvement may be obtained by systems which employ a plurality of codes (symbol alphabet) by transmitting a sequence of spread symbols whose energy distance has been maximized and equalized to enhance the decision thresholds as opposed to using an uncoded signal. In addition, enhanced time resolution may be obtained with the increased bandwidth.

The trend towards "Intelligent Jamming" mandates future tactical communications systems possess Electronic Counter Counter Measures (ECCM) responsive signal formats. The ECCM response to interference must be real time and adaptive to maximize the probability of successfully receiving a message. In addition, the "Adapted" transmission must be burst transmissions to enhance the Low Probability of Intercept (LPI). Consistent with burst transmission is the requirement for rapid data synchronization without repeat transmissions.

The determination of the signal to noise ratio at the output of the correlator to a communication system is considered to be fundamental to any ECCM adaption. The objective of the adaptation is the maintenance of the minimum information bandwidth (BWI). The signal-to-noise ratio of the correlator output (S/N)out will specify a Bit Error Rate (BER) which must be equal to or less than the BER required to maintain the BWI. Other factors (i.e., error correcting coding/interleaver gains, decoder efficiency, etc.) will determine this maximum BER for successful transmission With proper knowledge of (S/N)out, a successful adaptation can be achieved.

United States patents of interest include U.S. Pat. No. 4,730,340 to Frazier, Jr., which discloses a communication system which includes the acquisition, synchronization and recovery of coherently coded and combined spread spectrum symbol formats. In the receiver of the patent an incoming unknown symbol sequence capable of being acquired is applied in parallel to all cells of a matched filter correlator array. Horwitz in U.S. Pat. No. 4,644,523, improves the signal-to-noise ratio in a spread spectrum system by using a plurality of transmitters synchronized by a common clock and spread by a common bipolar pseudo-random code. Bjornholt et al, in U.S. Pat. No. 4,447,907, use multiple code generators and multiple mixers in a spread spectrum system. Multiple continuous spread spectrum signals are taught by Ward et al in U.S. Pat. No. 4,164,628 Lambert U.S. Pat. No. 4,320,513 describes a spread spectrum system having a circuit for the production of a number of different codes.

Historically, coherent detection of a non-spread digital signal such as a binary amplitude modulated (AM) signal requires the receiver to possess knowledge of the phase of the received signal carrier. To be coherent, the receiver must have or generate a carrier whose frequency and phase match the incoming carrier. In practice, the receiver does not possess this knowledge but rather extracts the information from the received signal from which a carrier can be generated.

Definitions of some terms are:

1. Modulation: Alteration of the frequency, phase or amplitude of a wave in accordance with a signal.
2. Symbol: A discrete pattern displayed or transmitted in order to convey information.
3. Spread Spectrum Artificially broadens the message spectrum prior to transmission.
4. Chip: Time duration of one alteration of the spreading code, a "1" or a "0".

SUMMARY OF THE INVENTION

An objective of the invention is to provide an improved synthetic coherent demodulation technique for multiple modulation RF spread spectrum signal formats. Another objective is to provide an improved "Low Probability of Exploitation" (LPE) radio frequency (RF) signal format for spread spectrum transmissions.

The invention is directed to a spread spectrum radio frequency (RF) communication system whose purpose is to "spread" the information bandwidth such that when it is de-spread any atmospheric interference (including jamming) is spread rather than de-spread. A "low probability of exploitation" is obtained through the use of a plurality of modulation types each of which creates a distinct spread spectrum symbol at the transmitter, and the reception of which requires a "match" condition at the receiver to determine the data bit state. The symbol sequence is known by the appropriate receivers and the collection of data bits forms a message.

DETAILED DESCRIPTION

SYNTHETIC DEMODULATION

Synthetic Demodulation (SD) is a signal processing technique which maximizes the mean squared signal level (t))/ $^2$. This is accomplished by the digital storage of complete signal formats which are subsequently compared (correlated) on a symbol-by-symbol basis with received signals of identical formats to determine if the result of each comparison will yield a binary "one" or "zero". All signal formats are Spread Spectrum (SS) with one data bit/symbol A step-by-step description of SD method follows:

1. Store data base of digitized reference signal formats (modulated carrier at an intermediate frequency (IF)).

2. Down convert the received signal to IF, digitize and store; time multiplex the input to achieve real-time Perform time alignment of the reference and the digitized received signal 4. Perform correlation to recover data, symbol-by-symbol. The result of the correlation is input to a threshold detector for a "one"/"zero" decision.

SD is explained below in terms of the arithmetic process required:

| | |
|---|---|
| $S_s(t+\tau)$ | Received symbol<br>$\tau \rightarrow$ Time misalignment |
| $S_r(t)$ | Stored replica of S(t) |
| T | Symbol length |
| $R_{sr}$ | Correlation of $S_s(t)$ and $S_r(t)$ |
| Step 1. | Time align<br>Time align $S_s(t)$ to $S_r(t)$ setting = 0 |
| Step 2. | Correlate<br>$R_{sr} = \frac{1}{T}\int_0^T S_s(t)\, S_r(t)dt$<br>$R_{sr} = \overline{(S(t)}^2$ = Average voltage = $V_{av}$ |

The digitized signals are normalized to ±1 volt before correlating with a normalized stored reference of ±1 V. The effect of this is the normalized integral of a cos 0 wave.

$$\cos^2 \omega t = \tfrac{1}{2} + \tfrac{1}{2}\cos 2\omega t$$

-continued $$R_{sr} = \frac{1}{T}\int_0^T \left(\frac{1}{2} + \frac{1}{2}\cos 2\omega t\right)dt$$

$$R_{sr} = \frac{1}{T}\left[\frac{t}{2} + \frac{1}{4\omega}\sin 2\omega t\right]\Bigg|_0^T$$

$$R_{sr} = \frac{1}{T}\left[\frac{T}{2} + 0\right] = \frac{1}{2}$$

$\omega$ = *IF* frequency (radians)

Figure 1:
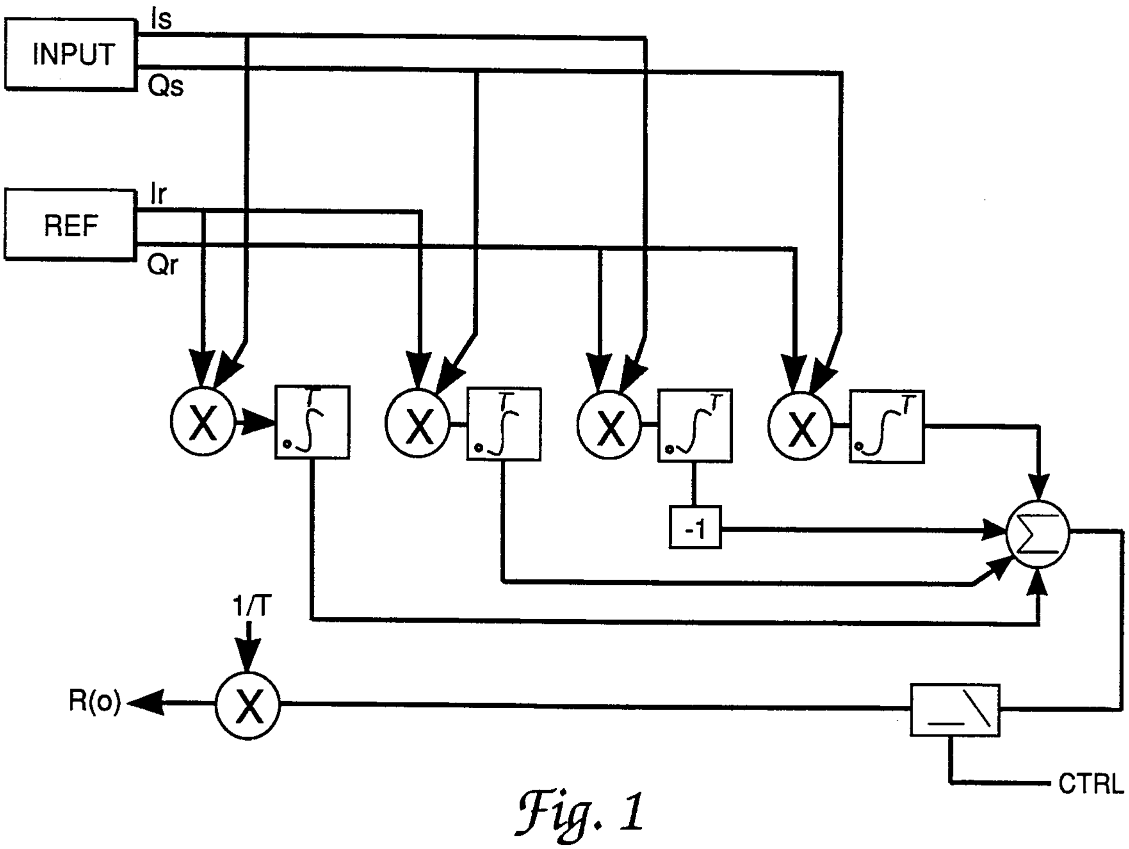
FIG. 1 is a block diagram showing a correlation process.

The actual correlation process uses in-phase (I) and quadrature (Q) components of the received signal and the reference signal. Therefore the actual correlation process is:

$$R_{sr}(\tau = 0) = \frac{1}{T}\left[\int_0^T I_r I_s dt + \int_0^T I_r Q_s dt - \int_0^T Q_r I_s dt + \int_0^T Q_r Q_s dt\right]$$

where:

$S_s(t)$ input signal
$S_r(t)$ stored reference
$I_r$ in phase component of reference signal
$I_s$ in phase component of input signal
$Q_r$ quadrature component of reference signal
$Q_s$ quadrature component of input signal If the input signal is not corrupted, i.e. (S/N)out≧10dB, the $I_s \cdot I_r$ and $Q_s \cdot Q_r$ vectors are collinear of equal magnitude and direction; therefore I/Q correlation is not required. If the input becomes corrupted, the angle between $I_s \cdot I_r$ and $Q_s \cdot Q_r$ is not zero; however the I·Q and Q·I components will act to correct the difference. Note in the above correlation equation that the $I_s$, $I_r$, $Q_s$, and $Q_r$ signals are digital samples of points along the waveform, whose scalar values are multiplied together at each sample point and then integrated over a symbol time period T; so that the angle is automatically taken into account. The block diagram of the correlation process is shown in FIG. 1.

ARTIFICIAL WRAPAROUND TRANSMISSION(AWT)

The AWT complements the SD in evaluating (S/N)out. The AWT acts to input the environment thus providing a receiver internal signal format evaluation, i.e., the transmitter plays no role in the AWT operation. With AWT, actual testing is performed in the receiver to determine the communications performance currently attainable with a particular signal format corrupted with the environmental noise.

A step-by-step description of AWT follows

1. Digitize the incoming RF environment. This environment must not include the desired transmitted signal.

2. Add the result of step 1 to a digital data modulated carrier.

3. Demodulate the combined signal using SD.

4. Compare the recovered data with the test data bit stream to evaluate performance using an appropriate figure of merit, i.e . BER.

5. Provide feedback to the adaptation software controller.

6. Repeat steps 2, 3, and 4 until a BER is acceptable.

7. Transmit to transmitter the adaptation that provided the required BER.

Inasmuch as the evaluation of the BER requires extensive time, the (S/N)out can be determined and referenced to the appropriate BER for the given signal format This does not imply the interference type is determined but does mean types of interferences have a close commonality in terms of BER. The assumption is the existence of a group of curves (BER vs (S/N)out) where each curve is a composite curve.

GENERALIZED DETERMINATION OF (S/N)out

Figure 2:
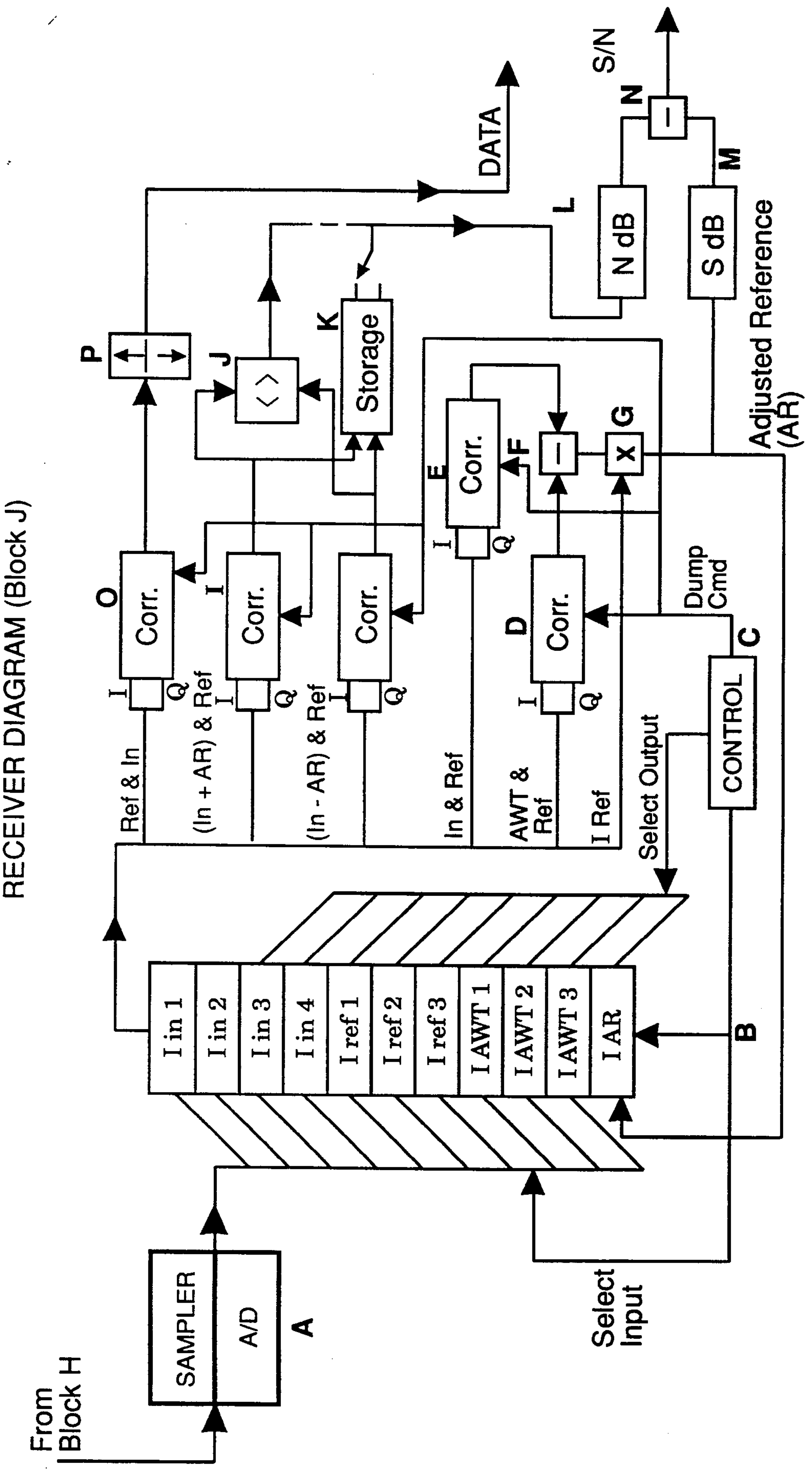
FIG. 2 is a receiver diagram.

FIG. 2 is a diagram of the algorithm used to determine the signal-to-noise ratio (S/N)out at the output of the digital correlator. As can be seen from the figure, both SD and AWT techniques are used in the determination of (S/N)out. This algorithm also provides for demodulation of the data. The algorithm is implemented on a Textronix digital oscilloscope (see FIG. 3). A generalized method for determination of the (S/N)out is first described followed by an explanation of the specific experimental set-up to implement and test in the laboratory.

Procedure to obtain (S/N)out:

| | |
|---|---|
| T | Symbol time |
| N1(t) | AWT Environment |
| N2(t) | Environment during signal time |
| S(t) | Data "1" symbol |
| −S(t) | Data "0" symbol |
| Ref(t) | Symbol reference |
| AR(t) | Adjusted reference |
| Symbol | Maximal length sequence |

The following procedure assumes the input symbol has been time aligned with the reference symbol:

1. Input, digitize environment ($N_1(t)$) only, store waveform [AWT function].

2. Input, digitize normal signal which is $[S(t))+N_2(t)]$ for a data "1" or $[-S(t))+N_2(t)]$ for a data "0" store waveform.

3. Correlates I and Q of $N_1(t)$ with I and Q of Ref (t), store result.

$$R_{nr}(0) = \frac{1}{T}\int_0^T [N_1(t)\cdot Ref(t)]dt = Vav_1$$

4. Correlate I and Q of input, $S(t)+N_2(t)$ or $-S(t)+N_2(t)$ with I and Q of Ref(t). Store result.

$$R_{(s+n)r} = \frac{1}{T}\int_0^T [[S(t) + N_2(t)]\cdot Ref(t)]dt = Vav_2$$

5. Difference step 4 and step 3, store absolute value.

$V_3 = |Vav_2 - Vav_1|$, store number.

6. Multiply the result of step 5 by the reference.
Ref(t)=adjusted reference AR(t), store result
Normalized reference signal=Ref)t)=Cos(ωt+Φ)
therefore, AR(t)=$V_3$ Cos (ω+Φ)

7. Perform below, store each result

| | |
|---|---|
| "One" data bit | $S(t) + N_2(t) + AR(t) \rightarrow A_1$ |
| | $S(t) + N_2(t) - AR(t) \rightarrow A_2$ |
| "Zero" data bit | $-S(t) + N_2(t) + AR(t) \rightarrow B_1$ |
| | $-S(t) + N_2(t) - AR(t) \rightarrow B_2$ |

8. With the reference I and Q correlate the input which will be a "one" or "zero" data bit.

| | |
|---|---|
| "One" data bit | $A_1$(I and Q) and $A_2$(I and Q) |
| "Zero" data bit | $B_1$(I and Q) and $B_2$(I and Q) |

9. Select least value of correlations in step 8 and the resultant waveform associated with the least value i.e., $A_1$ or $A_2$ if a "one" data or $B_1$ or $B_2$ if a "zero" data bit. The least valued waveform is noise (N).

10. Determine dB power of AR(t) (step 6) and dB power of noise ($N_2(t)$ (t)), step 9.

11. Perform AR (dB)−$N_2$ (dB)=S/N

12. Determine correlator out (S/N)out by the following (S/N)out=Processing Gain (PG)+S/N−correlation loss The correlation loss is determined by the autocorrelation (I and Q) of the reference, the range is $0.75 \leqq R(\Phi) \leqq 0.95$.

The middle of the range is assumed.

$$\text{Therefore, the correlation loss (dB)} = 10 \log 0.85 = -0.7$$

Processing gain is calculated in the normal way. (S/N)out can now be calculated.

EXPERIMENTAL SYSTEM

Figure 3:
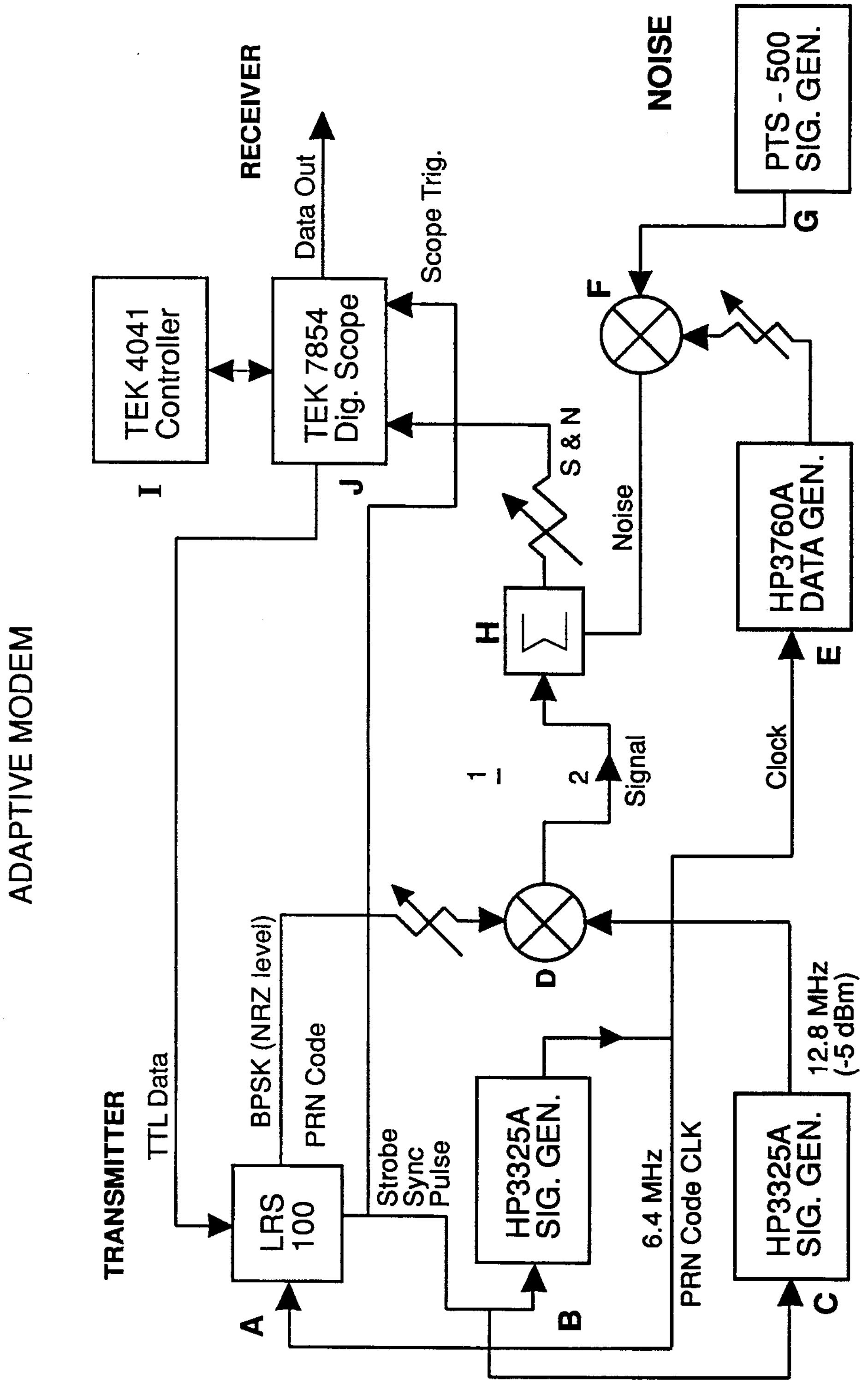
FIG. 3 is a diagram of an adaptive modem for a laboratory system.

The experimental system used to obtain the (S/N) is shown in FIG. 3.

Block A: LRS-100 Spread Spectrum Generator New Wave Instruments

Block A is a programmable code generator whose purpose is to generate the spreading code used to modulate the carrier which action "spreads" the data. The LRS-100 is capable of generating 1) Biphase shift key, 2) Quadrature shift key, 3) Offset or staggered quadrature shift key. This system uses Biphase shift key. The clock and data for the LRS-100 both come from external sources, block B and J respectively. The LRS-100 also generates a strobe (pulse at the beginning of each code sequence) used to synchronize the 7854 digital scope to the LRS-100.

Block B: HP3325A Signal Generator

Block B generates the clock (6.4 MHz) for the LRS-100. Block B serves to synchronize the entire system.

Block C: HP3325A Signal Generator

Block C generates the carrier frequency of 12.8 MHz whose output feeds the mixer, block D, along with the LRS code output.

Block D: HP10534A Mixer

Block D serves mix the carrier code where the mixer output is Biphase shift key. Equation 1 describes the mixing for M-ary phase shift key which includes Biphase. Equation 1 implies 100% modulation i.e. any phase shift between 0 and 180 is allowed.

$$S(t) = 1 \cos\left(\omega_c t + \frac{Mn\Delta\Phi}{2}\right) \quad (1)$$

$S(t)$ = Mixer output
$\omega_c \rightarrow$ carrier radian frequency
$Mn \rightarrow$ Symmetric n-level *NRZ* baseband signal
where $Mn = \pm 1$ for Biphase
$\Phi = 2/n$ separation between adjacent phases.

Block E: HP3760A Code Generator

Block E serves to generate a pseudo random code (PRC) non-synchronized to system which is mixed with a carrier of 12.7 MHz to 12.8 MHz from block G.

Block F: HP10534A Mixer

Block F mixes the noise code with the noise carrier, block G, to generate the noise signal.

Block G: PTS-500 Signal Generator

Block G serves to generate an adjustable carrier which acts as the noise source after mixing with block E output.

Block H: Anzac THV-50 Combiner

Block H combines the signal and noise.

Block I: Textronix 4041 Controller

Block I is a memory repository for waveforms digitized by the 7854 and for program codes. The 4041 operates off-line with the 7854 scope.

Block J: Textronix 7854 Digital Oscilloscope

Block J acts as the system receiver by digitizing the applied inputs, storing the inputs to permit arithmetic operations and displaying the digitized waveforms thru a digital to analog converter (D/A). This scope has a bandwidth of 400 MHz with a 10 bit resolution.

EXPERIMENTAL RESULTS

The experimental results clearly demonstrate the capability of determining the (S/N)out within an A/D error budget of ±6 dB when the signal was corrupted with intentional interference.

The evaluation of (S/N)out is normally associated with thermal noise, i.e. non-deterministic noise; however, for the purpose of deliberate communications interference, thermal noise is considered least likely. The tests performed used the following interferences:

a. Biphase shift key modulated carrier that matched the desired carrier.
b. Tone jamming
c. Thermal noise The AWT is used to obtain all "Noise Only" signals; however, the time the noise is inputted and digitized occurs prior to the inputting of the desired signal corrupted with noise. This is an unavoidable procedure which can be detrimental to the accuracy of the (S/N)out especially with noise whose amplitude is time dependent.

The experimental results of (S/N)out are shown in FIGS. 4 through 8.

A delineation of the characteristics of the desired signal and noise signals follows.

Desired signal characteristics—all plots. (Spread Spectrum)

a. Carrier frequency = 12.8 MHz
b. Spreading code clock rate = 6.4 MHz
c. Code = Maximal length code of 31 chips
d. Modulation = BiΦ shift key
e. Data code = NRz level
f. Signal = 8 mv p—p Noise Signals FIG. 4 [(S/Ne* vs Phase Shift in Chips)]

a. Spread spectrum
b. Carrier frequency = 12.8 MHz
c. Spreading code clock rate = 6.4 MHz
d. Modulation = BiΦ shift key
e. No data on modulated carrier
f. S/Na = 9 dB FIG. 5 [(S/Ne vs Phase Shift in Chips)]

Figure 4:
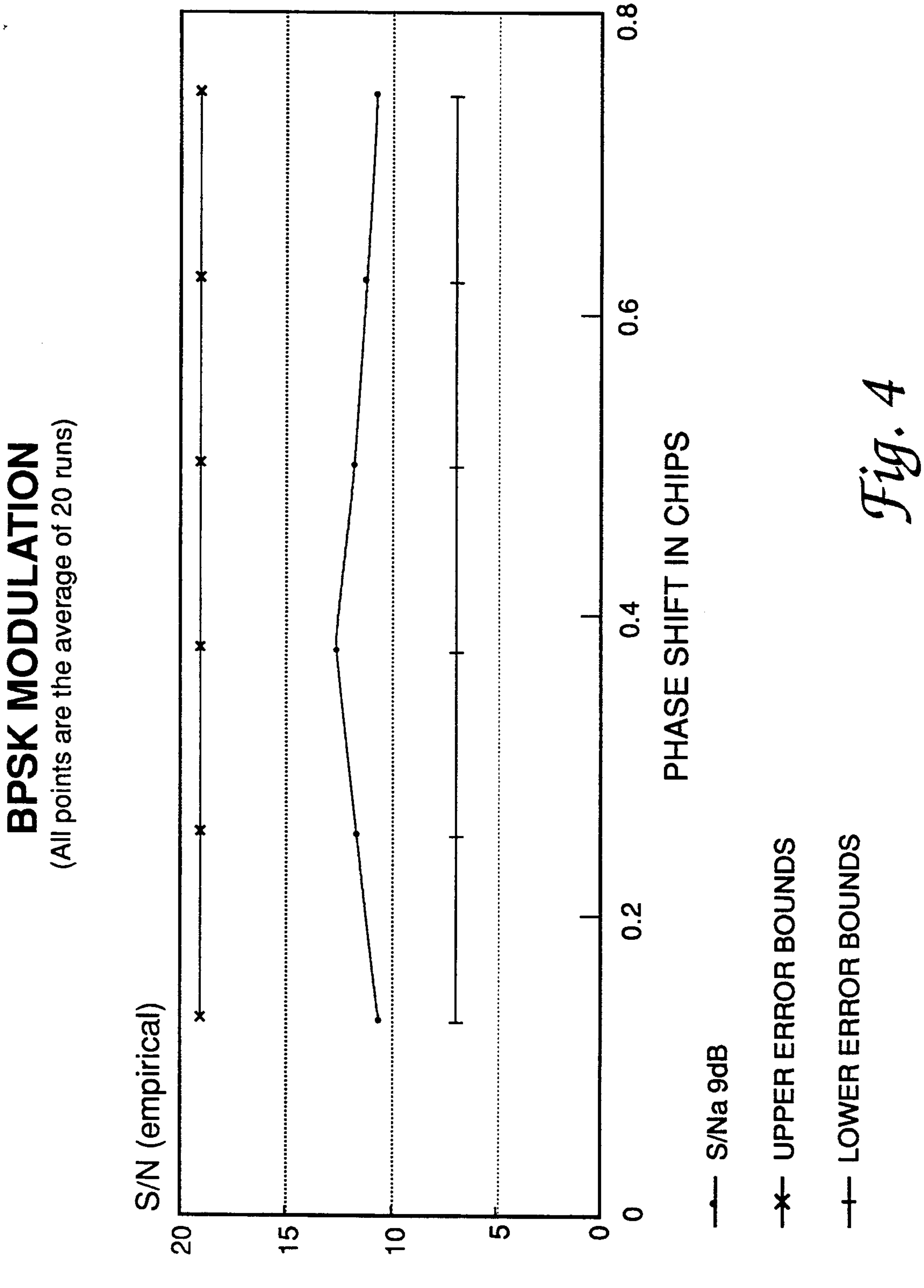
FIGS. 4 and 5 are graphs showing empirical S/N ratios vs. intentional interference (code) using BPSK modulation.

Same as FIG. 4 except S/Na = 13 dB

Figure 6:
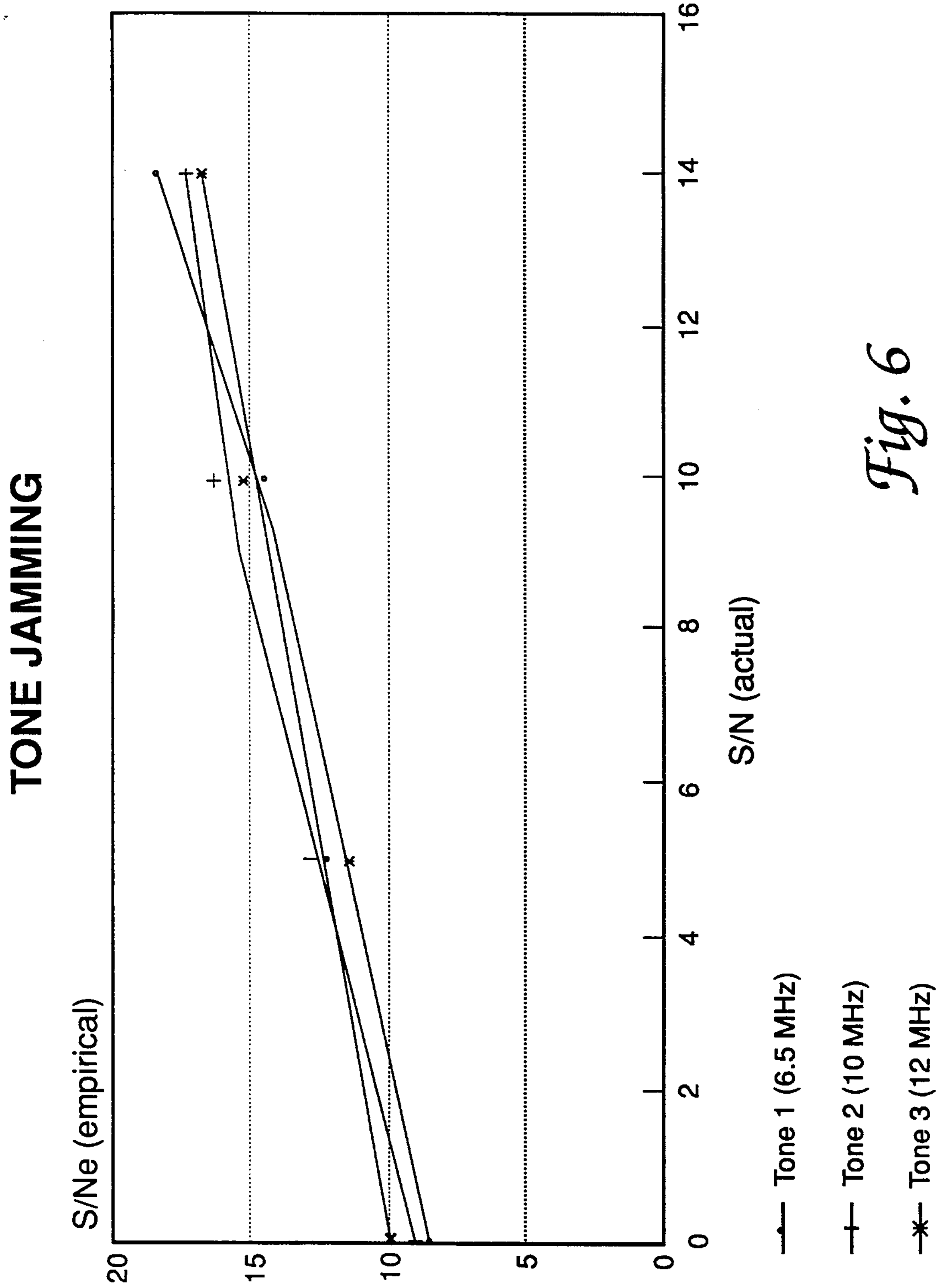
FIGS. 6 and 7 are graphs showing empirical S/N ratios vs. intentional interference (code) using tone jamming.

FIG. 6 [S/Ne vs S/Na]

a. Tone 1 = 6.5 MHz
b. Tone 2 = 10.0 MHz
c. Tone 3 = 12.0 MHz

*S/Na Spectrum Analyzer Signal to Noise Ratio

*S/Ne Empirical Signal to Noise Ratio (as determined by SD/AWT)

Figure 7:
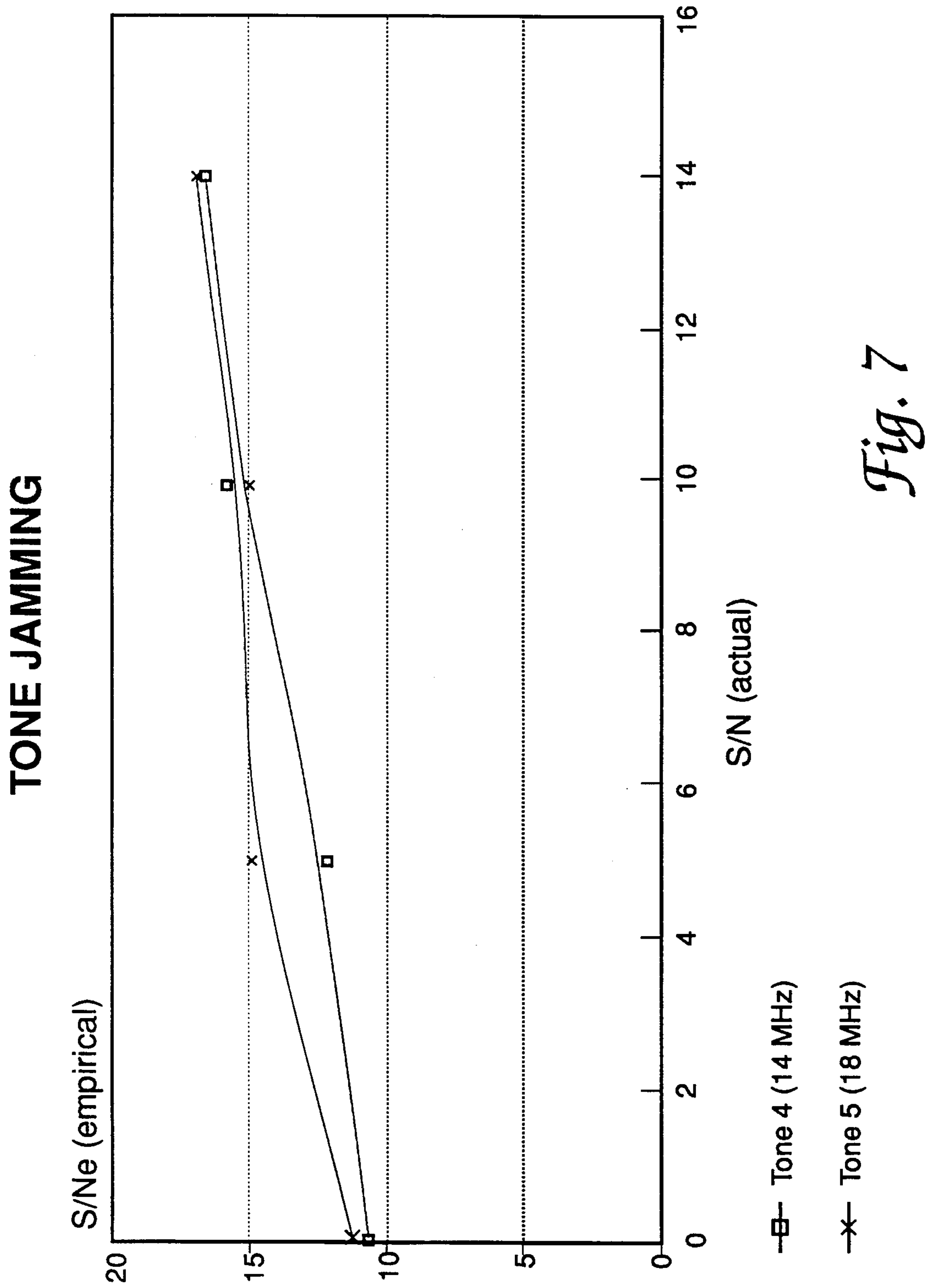

FIG. 7 [S/Ne vs S/Na]

a. Tone 4 = 14 MHz
b. Tone 5 = 18 MHz

Figure 8:
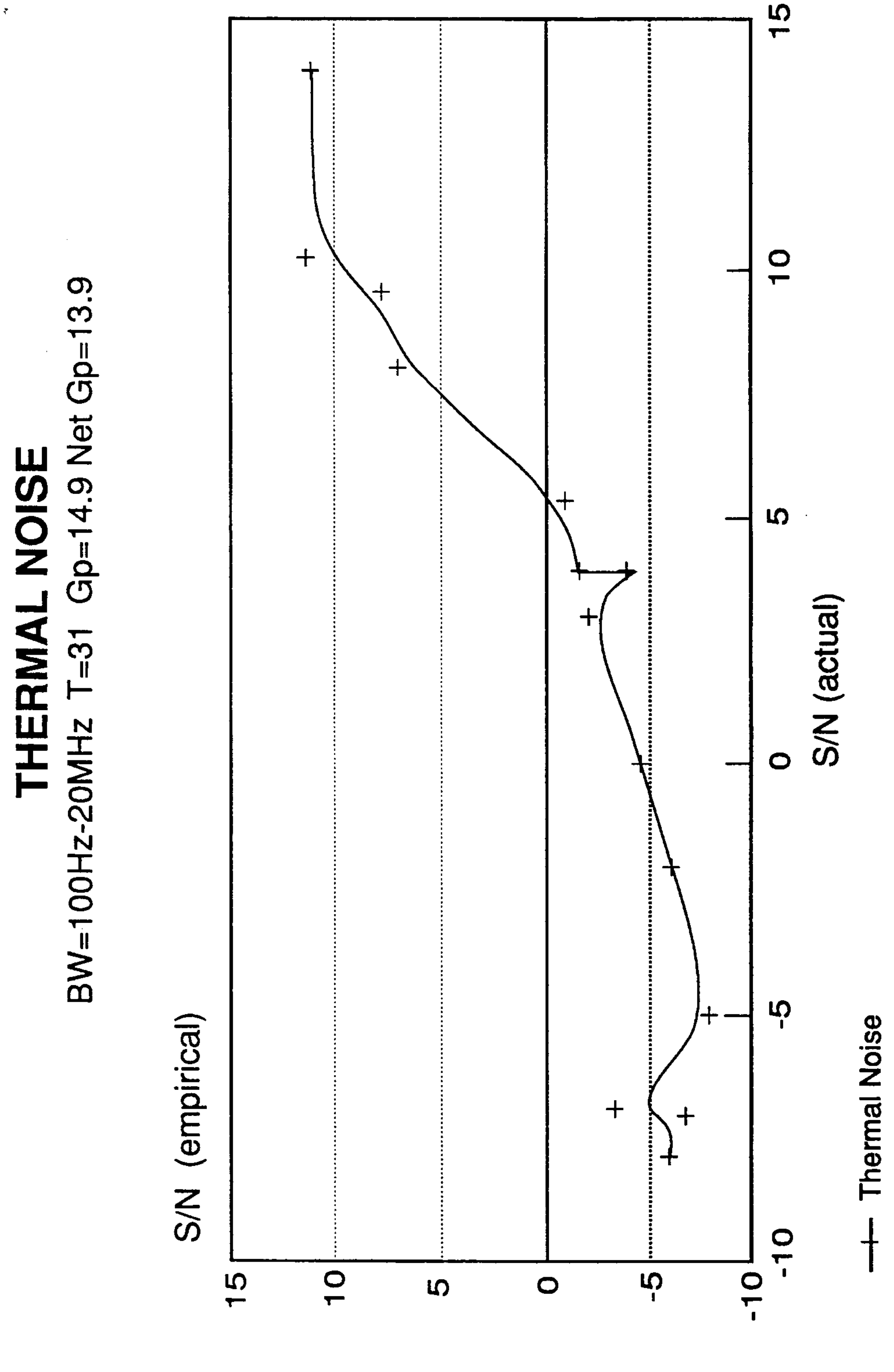
FIG. 8 is a graph showing empirical S/N ratios vs. intentional interference (code) using thermal noise.

FIG. 8 [S/Ne vs S/Na]

a. Random thermal Noise
b. BW = 20 MHz

Figure 5:
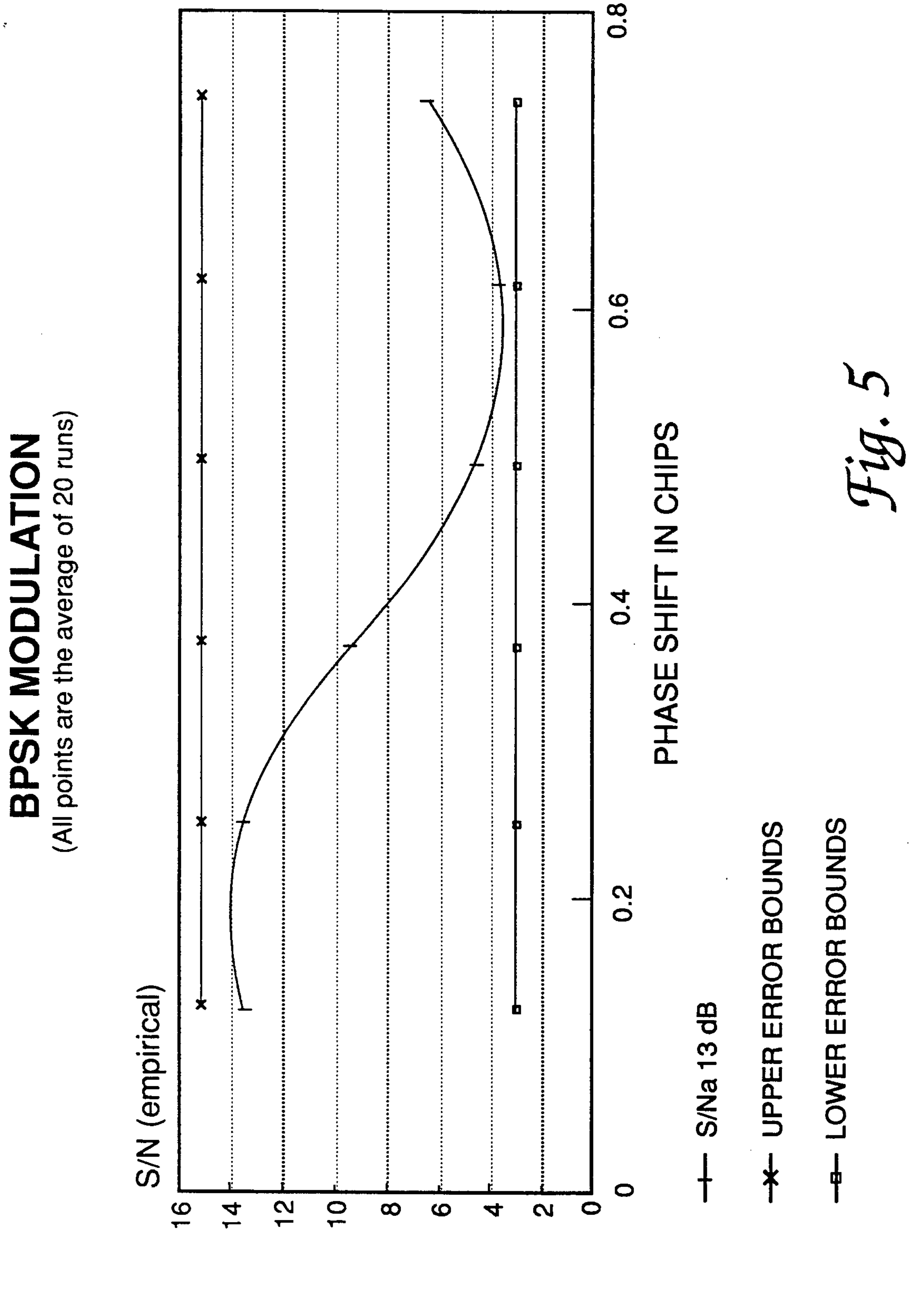

FIG. 4 (constant S/N shows about a 2.5 dB S/Ne variation for a noise code whose phase displacement, relative to the desired signal, ranged from 0.1 of a chip period to 0.8 of a chip period. In other words, the S/Ne was relatively steady. FIG. 5 (constant S/N shows a 10 dB S/Ne variation for the same noise signal format as FIG. 4. The chip phase displacement range of $\frac{3}{8}$ chip period to $\frac{3}{4}$ chip period shows a large (6dB) S/Ne variation. This obviously shows a strong correlation of reference signal with the noise only (AWT) signal.

FIGS. 6 and 7 show a S/Ne variation of about 7 dB from a measured (S/Na) of 0 dB to +14 dB. The tones exist for particular frequencies, i.e., not across the entire frequency band of interest. Because of this, the S/Ne will not track the S/Na.

FIG. 8 shows the empirical results of S/Ne vs S/Na, i.e., the noise is spread uniformly across the Nyquist bandwidth (0 to <f S/2, fs = sampling frequency). The lack of a 45° plot (one-to-one correspondence) is primarily due to the fact that the noise is inputted (AWT) at a different time than the signal plus noise. The code length is 31; thus, the correlation process will not produce a zero correlation with noise. If the code is extended in length, the noise correlation will fall. The result is a S/Ne vs S/Na plot that tends towards 45°.

In summation, base upon the data taken, the experimental results confirm the feasibility of the empirical determination of (S/N)out ratios in real-time and in realistic environments.

SUMMARY

This document has presented the mathematical and conceptual development of some innovative signal processing techniques which show potential for application to adaptive communications systems of the future. The theory behind SD, AWT, and a generalized determination of the S/N ratio at the output of a digital correlator was presented. All of these concepts are essential to build an adaptive receiver which can "sense" the electromagnetic environment and respond in real-time to counter any threats in that environment. Determination of the correlator S/N output is the key figure of merit in the process. This ratio can be related to the BER of the communications system for a given required minimum information BWI Unfortunately, not all BER vs correlator output ratios have been established in the literature for all jamming types of interest. However, the procedure for adaptation is general in nature—once the curves are established, it would merely be a table fill in the digital receiver.

This document also establishes a method for the experimental confirmation of determination of the digital correlator output S/N ratio The laboratory set-up is described and the data is documented for a few jamming types. The results of the experimental efforts clearly showed that the (S/N) out can be determined in real-time and in a real environment.

BACKGROUND OF COHERENT DETECTION

Historically, coherent detection of a non-spread digital signal such as a binary amplitude modulated (AM) signal requires the receiver to possess knowledge of the phase of the received signal carrier. To be coherent, the receiver must have or generate a carrier whose frequency and phase match the incoming carrier. In practice, the receiver does not possess this knowledge but rather extracts the information from the received signal from which a carrier can be generated.

Figure 9A:
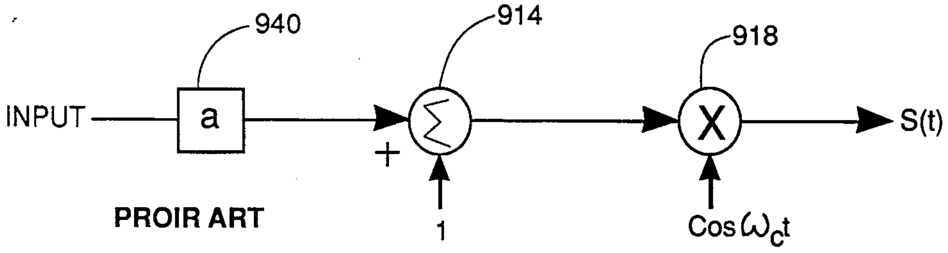
FIGS. 9*a* and 9*b* are functional block diagrams showing a digital binary amplitude modulator and demodulator respectively.
Figure 9B:
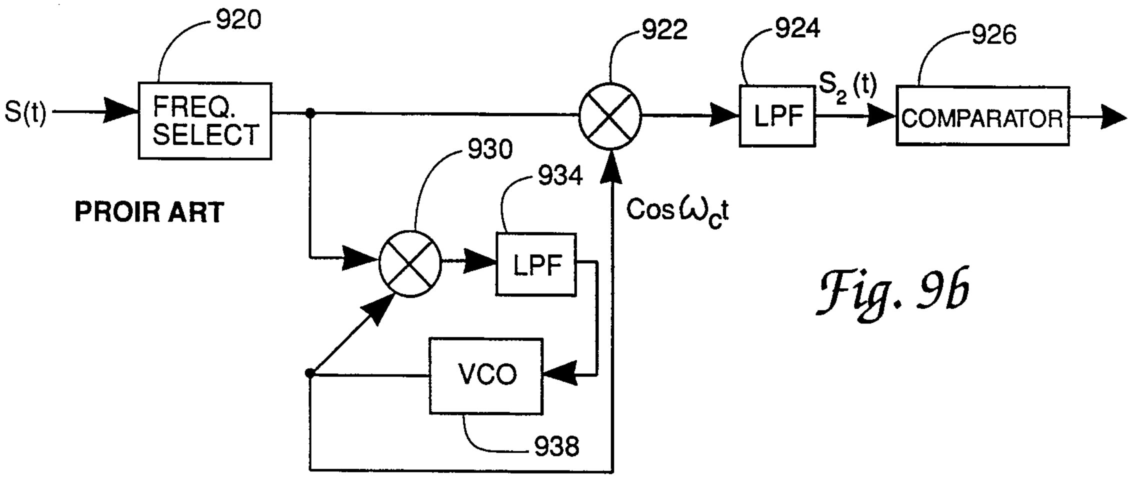
Figure 9C:
FIGS. 9*c*, 9*d* and 9*e* are graphs showing the signal at different points of the system shown in FIGS. 9*a* and 9*b*.
Figure 9D:
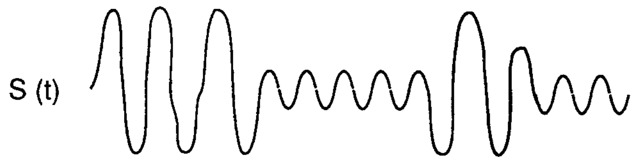

FIG. 9*a* shows a digital binary modulator, followed by a de-modulator in FIG. 9*b*. The modulator is shown symbolically as having an input signal applied to a unit 910 providing a modulation index "a", followed by a summing unit 914 which adds a numerical value of "1" to the signal, and a mixer 918 which uses the signal to modulate a carrier signal cos $\omega_c t$, to produce an output signal S(t). Graphs representing the input signal and the output signal S(t) are shown in FIGS. 9*c* and 9*d* respectively. The equation for the output signal is:

$$S(t)=[1+am_n(t)]\cos\omega_c t$$

where a = Modulation Index ($0<a\leqq 1$)

$m_n(t)$ = n Level NRZ data $\omega_c=2\pi f$, Carrier Frequency in radians

Figure 9E:

In the receiver of FIG. 9*b*, the signal S(t) received from the transmitter of FIG. 9*a* is supplied to a tuner or frequency select unit 920, whose output is applied to two mixers 922 and 930. The mixer 930, a low pass filter (LPF) 934 and a voltage controlled oscillator (VCO) 938 form a narrow band filter that extracts the carrier frequency. The carrier frequency cos $\omega_c t$ from the VCO 938 is supplied as a local oscillator signal to the mixer 922, where it is mixed with the output of the tuner 920. The output of the mixer 922 is filtered in a low pass filter 924 to produce the signal $S_2(t)$ which is represented by the graph of FIG. 9*e*. The signal $S_2(t)$ is supplied as an input to a comparator 926, whose output is the signal Mn(t), reproducing the input signal to the transmitter of FIG. 9*b*.

Figure 10A:
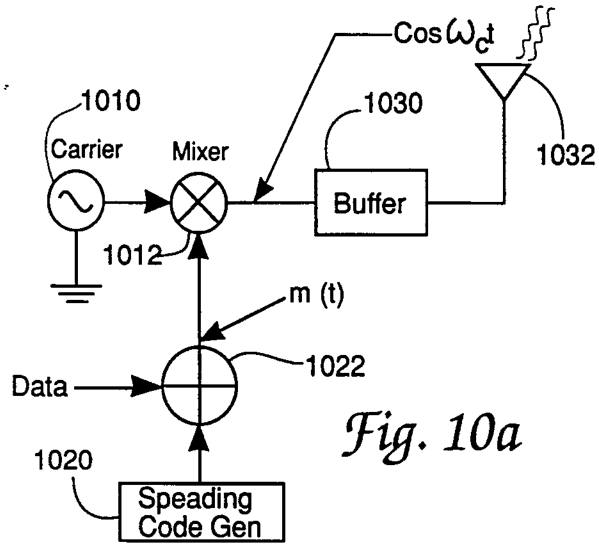
FIGS. 10*a* and 10*b* are functional block diagrams showing a BPSK modulator and demodulator respectively.
Figure 10B:
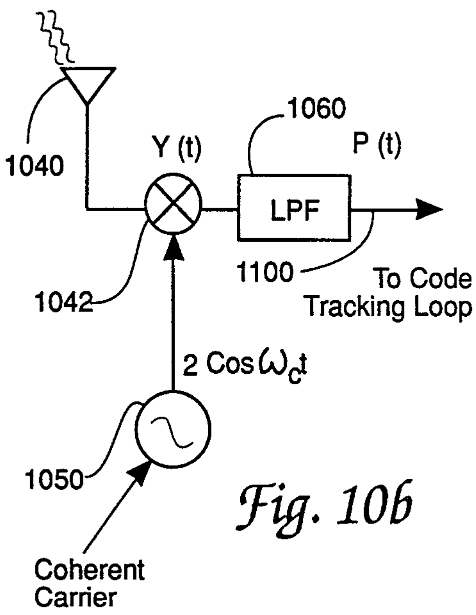

Next a spread spectrum modulator is depicted in FIG. 10*a* and a de-modulator in FIG. 10*b*. The modulation type is Bi-phase shift key whose purpose is to "Spread" the information bandwidth such that when it is de-spread any atmospheric interference (intentional) is spread rather than de-spread. The modulator comprises a carrier source 1010, followed by a mixer 1012, a buffer amplifier 1030, and an antenna 1032. A signal from a spreading code generator 1020 is combined with the data in a circuit 1022 to provide a signal m(t) which is supplied to the mixer 1012.

Figure 14:
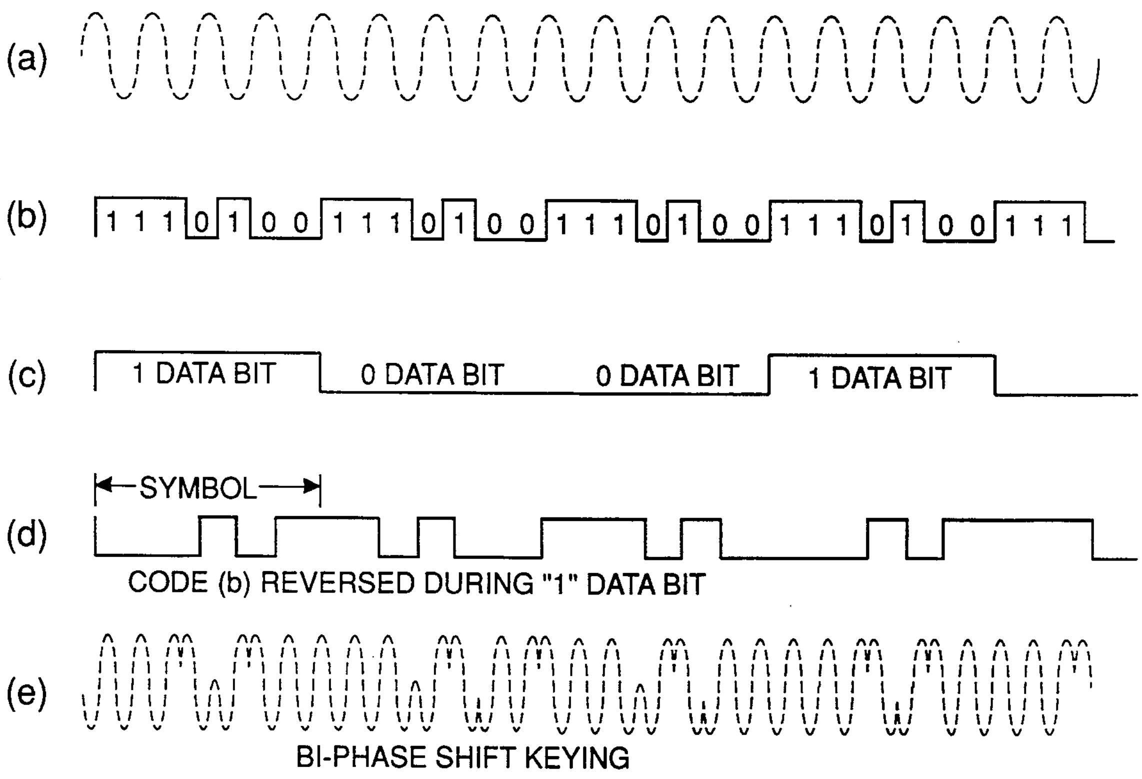
Figure 16:
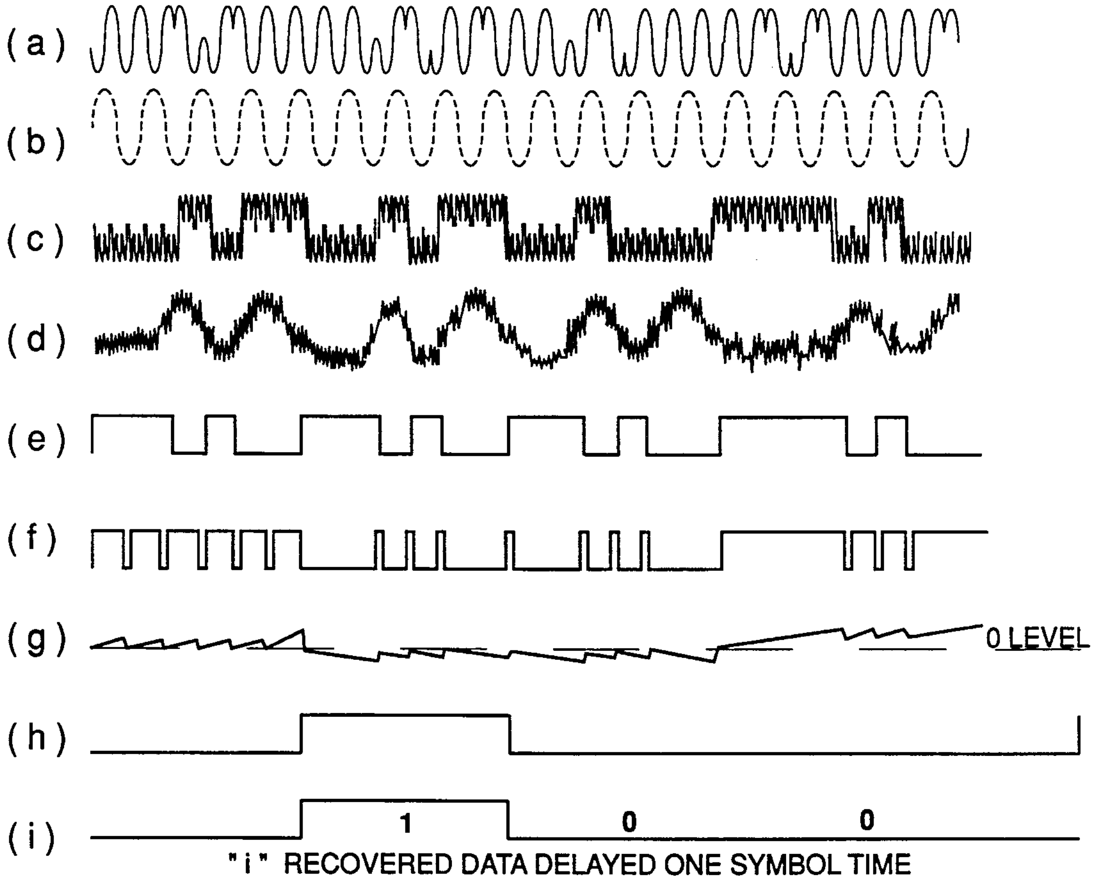

The signal transmitted from antenna 1032 is received at antenna 1040 and supplied to a receiving mixer 1042 The demodulation process requires as with the AM case the receiver generation of a coherent carrier plus a bit and position synchronized (with the input) code which is a replication of the transmitter code which was used to spread the signal. FIG. 10*b* shows the coherent carrier as being supplied by a source 1050, to supply a signal (2 cos $\omega_c t$) to the mixer 1042. The signal Y(t) from the mixer 1042 is passed through a low pass filter 1060 to provide an output signal P(t) to a Code Tracking Loop. FIGS. 14 and 16 depict the modulation/ demodulation process The low pass filter 1060 removes the twice carrier term leaving the "Baseband" signal. The baseband signal is the spreading signal which must be aligned with a receiver generated replica after which the two are multiplied together leaving data. The generation of the receiver code requires a process similar to that required for the carrier generation.

Figure 11:
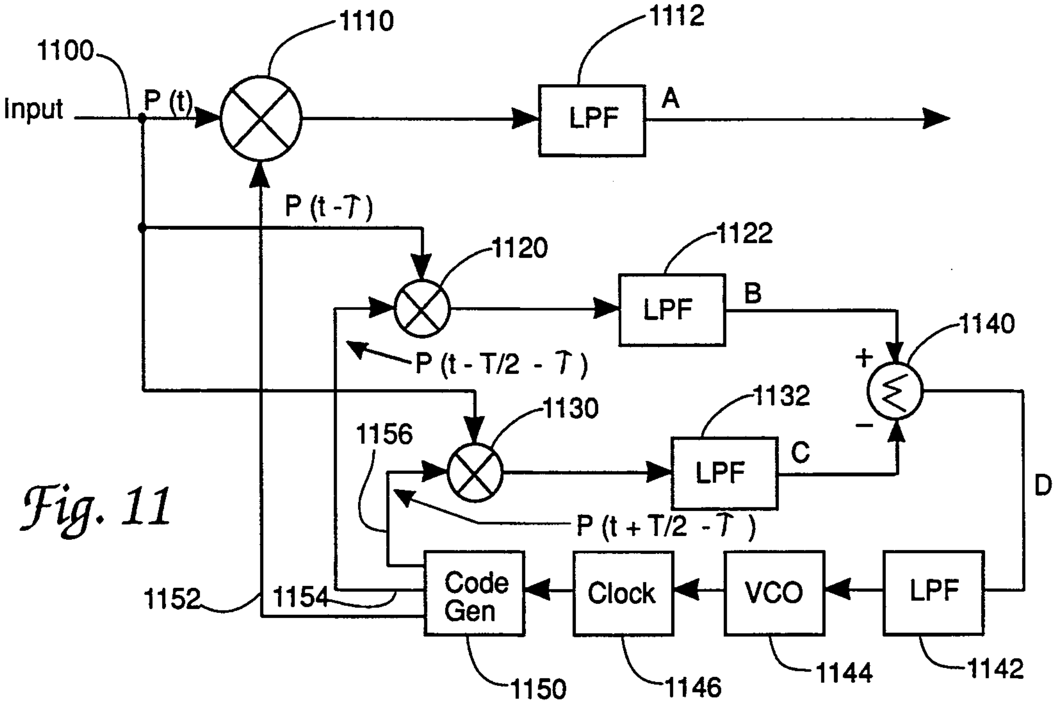
FIG. 11 is a functional block diagram of a coherent delay locked loop for the demodulator of FIG. 10*b*.

A coherent delay lock code tracking loop is shown in FIG. 11, where the input signal P(t) on line 1100 is the signal out of the demodulator of FIG. 10*b*. The input line 1100 is coupled to three mixers 1110, 1120 and 1130. The output of mixer 1110 goes through a low pass filter 1112 to provide a signal A to a code stripping circuit. The output of mixer 1120 goes through a low pass filter 1122 to provide a signal B to a plus input of a summing circuit 1140, and the output of mixer 1130 goes through a low pass filter 1132 to provide a signal C to a minus input of the summing circuit. The output of the summing circuit 1140 provides a signal D which through a low pass filter 1142 to a voltage controlled oscillator (VCO) 1144. A clock circuit 1146 is controlled by a signal from the VCO 1144, and supplies a clock signal to a code generator 1150. The code generator has three output lines 1152, 1154 and 1156 coupled respectively to the mixers 1110, 1120 and 1130.

The signals in FIG. 11 are explained as follows:

$\tau\rightarrow$Initial Delay

A→Punctual Channel

B→Early ($\frac{1}{2}$ chip) channel 1 Chip Time=T

C→Late ($\frac{1}{2}$ chip) channel

D→B+C→Correction Signal

Assume the initial delay $\tau$ is reduced to zero. The B & C signals of early and late correlation are subtracted to form a correction signal "D" which is used to drive the voltage controlled oscillator 1144. The output of the VCO 1144 drives the clock 1146 which drives the code generator 1150 (replication of transmitter code generator) in such a manner that if the clock output is lagging, the correction signal "D" drives the clock faster (thru the VCO) and the reference code speeds up and runs in coincidence with P(t) i.e. reference code is tracking the received signal code. The punctual code (on line 1152) is next fed to the mixer 1110 and mixed with the input code from line 1100 to "Strip" the code leaving data via the low pass filter 1122.

Figure 15:
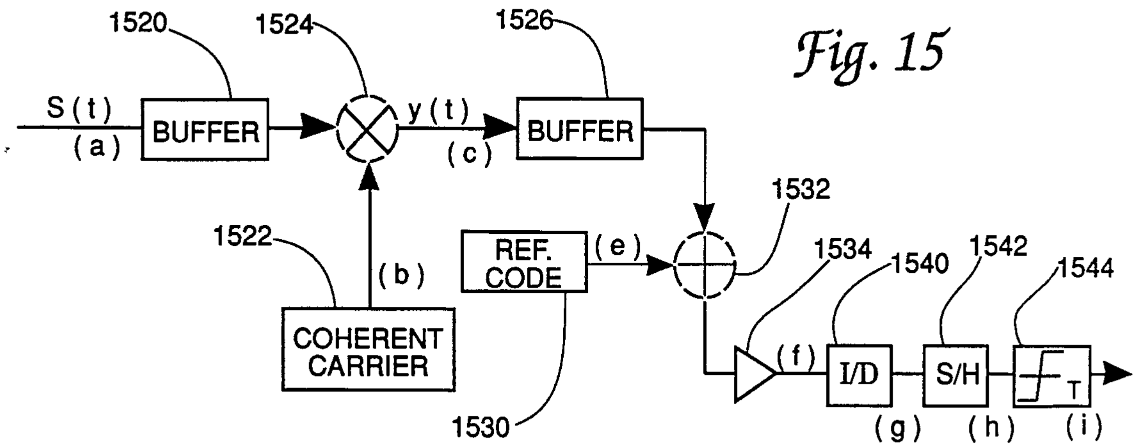

The receiver generation of the coherent carrier for the Bi-phase shift key (BPSK) modulation is not as simple as shown for the AM case. The reason for this is the fact that double side band modulated signals result in a carrier suppressed frequency spectrum. This means the carrier signal is very low and as such the generation of the receiver reference is complicated. Usual means of generating the carrier are by "Costa Loops", squaring loops, frequency doublers on full wave rectification (produces a twice carrier frequency) after which the output is filtered to obtain only the twice carrier frequency. This is fed to a frequency divider to give a carrier frequency component which has a phase angle of 0° or 180° with respect to the carrier in any signal element (1 or 0). The effect of the uncertainty can be eliminated by using a differential coding at the transmitter such that "1" is transmitted by a change in phase and "0" by no change in phase. Another approach is to transmit polarity determining bits, meaning at the start of a message a few bits, say" 1's, are received such that the receiver knows 1 is positive and a 0 is negative or vice versa. This statement refers to the integrator or matched filter outputs as shown in FIGS. 15 and 16. The above operations are required for one type of modulation, meaning separate types for a plurality of modulation types.

SYNTHETIC DEMODULATION OF SPREAD SPECTRUM SIGNALS

This section describes a "Low Probability of Exploitation" (LPE) radio frequency (RF) signal format for spread spectrum transmissions.

Figure 12:
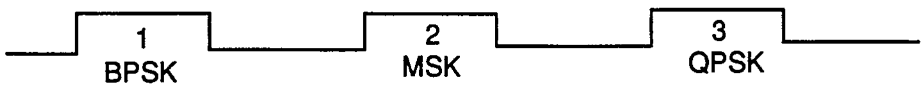
FIG. 12 is a symbolic graph showing multiple modulation symbols.

A novel means is claimed of enhancing an RF communications to achieve LPE communications through the use of a plurality of modulation type symbol signals. A plurality of modulation type symbols are represented in FIG. 12, where for example, symbol 1 might be BPSK, symbol 2 MSK, and symbol 3 QPSK. The multiple modulations each create a distinct spread spectrum symbol at the transmitter, the reception of which requires a "match" condition to determine the data bit state of "one" or "zero". The collection of data bits thus forming a message.

The usual spread spectrum signal has one type of modulation to "Spread" the RF energy to resist jamming and detection. Such a system (transmit/receive) is shown in FIGS. 13 and 14 for transmit, and in FIGS. 15 and 16 for receive.

Figure 13:
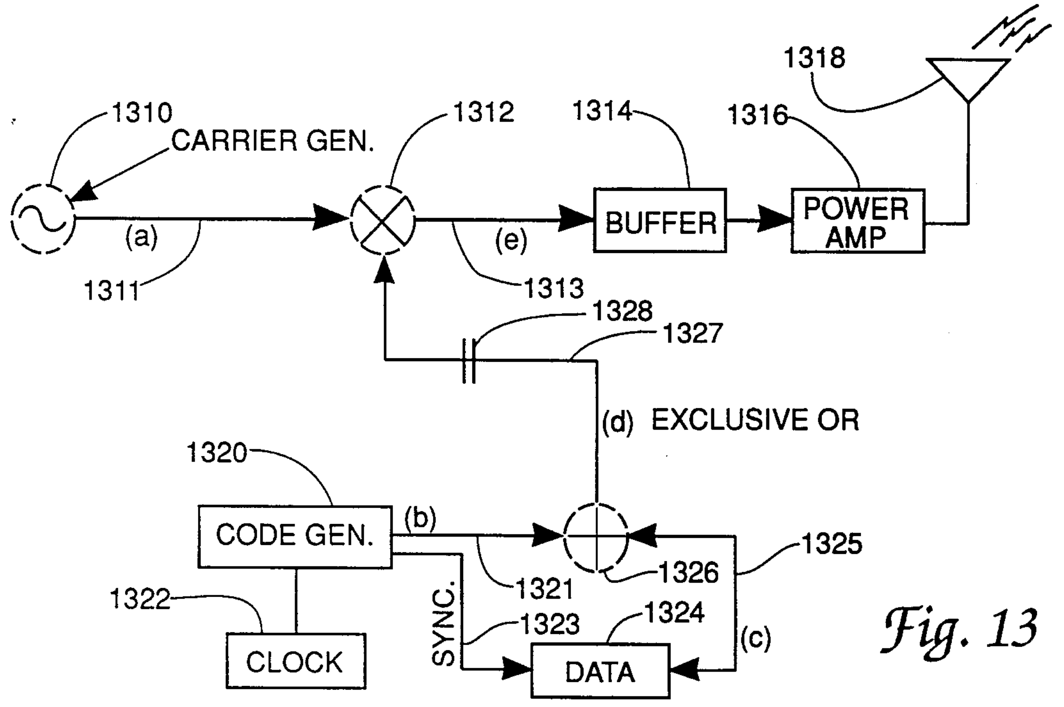
FIGS. 13–16 show a usual spread spectrum signalling system, with a transmitter functional block diagram shown in FIG. 13, graphs of the signal at different points of the transmitter shown in FIG. 14, a receiver functional block diagram shown in FIG. 15, and graphs of the signal at different points of the receiver shown in FIG. 16.

The transmitter of FIG. 13 has a carrier generator which supplies an RF carrier signal via line 1311 to a modulator mixer 1312, as shown by graph (a) of FIG. 14. A code generator 1320 under the control of a clock 1322 provides a code signal at line 1321, as shown by graph (b) of FIG. 14. The code generator also provides a synchronization signal on line 1323 to a data unit 1324. The output of the data unit 1324 on line 1325 is shown by graph (c) of FIG. 14. The signals on lines 1321 and 1325 are combined in an EXCLUSIVE-OR circuit 1326, to provide a modulating signal on line 1327, which is supplied via a capacitor 1328 to the mixer 1312. As shown by graph (d) of FIG. 14, the signal on line 1327 has the code of graph (b) reversed during a "1" data bit, but the same as that of graph (b) during a "0" data bit. A symbol as shown in graph (d) is the duration of each data bit from the data unit 1324. The modulated output from the mixer 1312, shown by graph (e) of FIG. 14 is supplied via a buffer amplifier 1314 and a power amplifier 1316 to an antenna 1318. The signal S(t) shown by graph (e) of FIG. 14 is $$S(t) = [B(t) \cdot \cos(\omega_c t)],$$

where B(t) = +1 for a 1 B(t)→Spreading Code
B(t) = −1 for a 0
$\omega_c$ = carrier of graph (a)

The receiver of FIG. 15 receives the signal S(t) from the transmitter of FIG. 14 via an antenna and input circuit (not shown) to a bandpass filter 1520. The input signal, shown by graph (a) of FIG. 16, is the same as that shown in graph (e) of FIG. 14 with some noise added. A coherent carrier signal represented by graph (b) of FIG. 16 is supplied from a source 1522. The outputs of the bandpass filter 1520 and the carrier source 1522 are supplied to a mixer 1524, whose output y(t) is shown by graph (c) of FIG. 16. After passing through a low pass filter 1526, the signal is as shown in graph (d) of FIG. 16. A reference code source 1530 provides a signal as shown by graph (e) of FIG. 16, which is the same as that shown by graph (b) of FIG. 14. The signals from the low pass filter 1526 and the reference code unit 1530 are combined in a unit 1532 and forwarded via an amplifier 1534 to an integrate/dump circuit 1540. The input and output signals of the circuit 1540 are shown as graphs (f) and (g) of FIG. 16. The output of circuit 1540 is supplied to a sample-and-hold circuit 1542, whose output is shown as graph (h) of FIG. 16. The signal passes through a threshold detector 1544, to provide a signal as shown by graph (h) of FIG. 16. This is the recovered data delayed one symbol time.

Figure 17A:
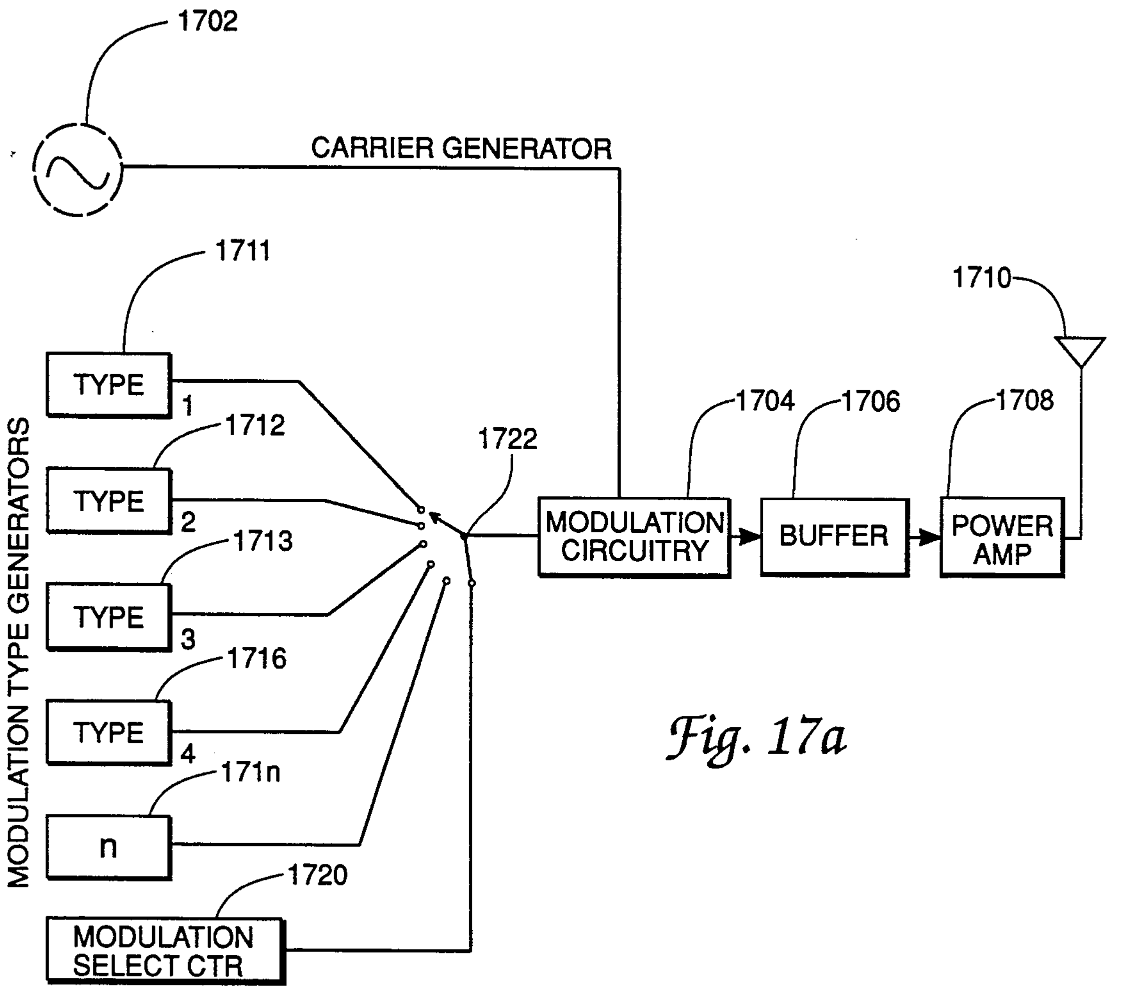
FIGS. 17*a* and 17*b* are block diagrams showing a modulator and demodulator respectively for a multiple modulation generation system.
Figure 17B:
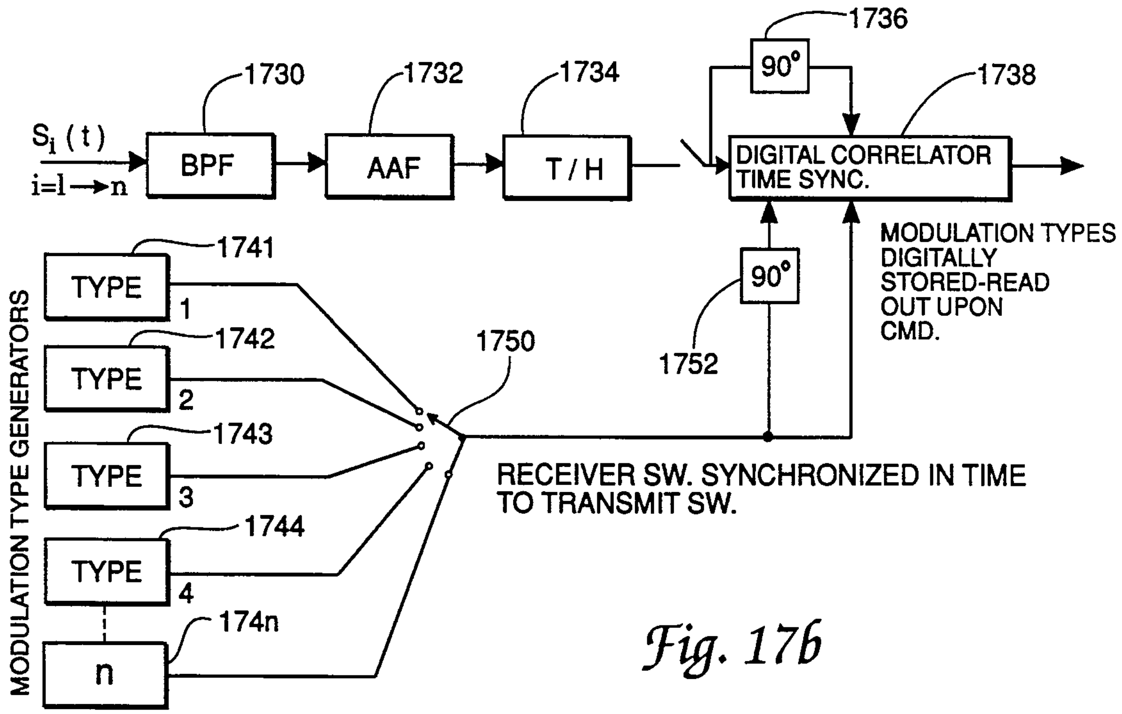

FIGS. 17a and 17b comprise a block diagram of a transmit receive system using a plurality of modulation types. In contrast to FIGS. 9a–9e, each symbol transmitted may be a different type of modulation e.g. BPSK, MSK, QPSK, FIG. 12. The actual sequence of symbol modulations can be a fixed pattern or a "Pattern for the day" such as a code sequence. It is understood that the symbol sequence is known by the appropriate receivers i.e. receivers that are intended to receive transmissions.

The receivers intended to use the transmissions may have the symbol sequence previously stored and called out for use to accomplish demodulation. Conversely, the receiver's symbol modulations can be generated within the receiver to accommodate any transmission assuming a prior knowledge between transmit and receive. This capability will allow a near real-time response, if required, to resist exploitation.

The demodulation procedure (signal processing) is identical for all types of spread spectrum modulations. The steps are:

1. Time align input signals (I&Q) with reference signals (I&Q).
2. Normalize input signal to ±1.
3. Perform
$I \times I = (a)$
$I \times Q = (b)$
$Q \times I = (c)$
$Q \times Q = (d)$
4. Perform: $(a) + (b) - (c) + (d) = (e)$
5. Integrate (e), divide by integration time.
6. Positive result = 1

7. Negative result=0

The transmitter and receiver as shown in FIGS. 17*a* and 17*b*. The transmitter comprises a carrier generator 1702 which supplies a carrier signal to a modulation unit 1704. There are n different modulation type generators 1711, 1712, 1713, 1714, . . . 171*n*. A modulation selection control unit 1720 controls electronic switching means shown symbolically as a rotary switch 1722, to select the modulation type for each symbol and supply it to the modulation unit 1704. The output is coupled via a buffer amplifier 1716 and a power amplifier 1708 to an antenna 1710.

The signal from the transmitter of FIG. 17*a* is received via an antenna and input circuit (not shown) of a receiver shown in FIG. 17*b*. The input signal is $S_i(t)$, where i is the modulation type from 1 to n. The input signal is processed via a bandpass filter 1730, an antialiasing filter 1732 (bandwidth<f sampling/2), and a track and hold circuit signal is supplied directly, and also via a 90° circuit 1736, to a digital correlator and time sync unit 1738. The receiver has modulation type generators 1741, 1742, 1743, 1744, . . . , 174*n*, which correspond to the modulation type generators of the transmitter as shown in FIG. 17*a*. The receiver electronic switch means 1750 is synchronized in time with the transmit switch 1722. The type symbol is supplied directly, and also via a 90° circuit 1752, to the digital correlator and time sync unit 1738. The modulation types digitally stored are read out upon command.

As a result of this embodiment, the receiver is completely digital with the exception of the frequency select circuitry which precedes the band pass filter 1730. This, in turn, allows a minimum (relative to multiple receivers i.e. one receiver/modulation type) number of different receiver type circuitry. If follows that the receiver is easily diagnosable and maintained.

ADVANTAGES of the synthetic demodulation are:

1. One method of demodulation (auto-correlation) is required regardless of the carrier modulation type.

2. The actual demodulation process is straight forward—carrier suppressed or carrier not suppressed.

3. No reference carrier generation is required in as much as the reference modulation contains the reference carrier.

4. The transmit signal format can use a plurality of modulation types, changing modulation type from signal element to signal element thus enhancing a low probability of exploitation by an unfriendly.

5. The reference modulations can be readily generated within the receiver and used assuming a prior knowledge of when to use the particular type.

6. The modulation types can be changed to suit an immediate intentional unfriendly jamming such that the transmitter message can be understood.

7. All signal processing performed in software thus allowing complete freedom for changes within the limits of the system.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A spread spectrum radio frequency (RF) communication system having a transmitter and a receiver whose purpose is to spread the information bandwidth such that when it is de-spread any interference including jamming is spread rather than de-spread, comprising means including a modulator for producing a plurality of modulation types each of which creates a distinct spread spectrum symbol, with a given sequence of symbols with selected modulation types at the transmitter, and means including demodulation means for reception which includes a match condition at the receiver to determine the data bit state, and means for determining the type of modulation impressed upon the received signal, wherein the sequence of symbols with selected modulation types is known by the receiver and the collection of data bits forms a message;

wherein the transmitter and the receiver each includes a plurality of generators for storing a set of said modulation types, switching means coupling said generators to the modulator at the transmitter and coupling said generators to the demodulation means at the receiver for selecting modulation types symbol to symbol from said set according to a fixed pattern, with the fixed pattern being the same at the transmitter and the receiver, and wherein the fixed pattern may be changed at agreed times.

2. A method of demodulation for use in a receiver of a spread spectrum radio frequency (RF) communication system having a transmitter and a receiver whose purpose is to "spread" the information bandwidth such that when it is de-spread any interference including jamming is spread rather than de-spread, with means including a modulator for producing a plurality of modulation types each of which creates a distinct spread spectrum symbol, with a given sequence of symbols with selected modulation types at the transmitter, and means including demodulation means for reception which includes a match condition at the receiver to determine the data bit state, and means for determining the type of modulation impressed upon the received signal, wherein the sequence of symbols with selected modulation types is known by the receiver and the collection of data bits forms a message, the receiver having detection means providing in-phase (I) and quadrature (Q) components of the received input signal, and also means providing in-phase (I) and quadrature (Q) components of a reference signal; wherein said demodulation method comprises the steps;

a) time align the in-phase and quadrature components of the input signals (I&Q) with the in-phase and quadrature components of the reference signals (I&Q), b) normalize input signal to $\pm 1$, c) perform $I \times I = A$, $I \times Q = B$, $Q \times I = C$, $Q \times Q = D$, d) perform: $A + B - C + D = E$, e) integrate E, divide by integration time, f) positive result=1, g) negative result=0.

3. A method of demodulation for use in a receiver of a spread spectrum radio frequency (RF) communication system having a transmitter and a receiver whose purpose is to "spread" the information bandwidth such that when it is de-spread any interference including jamming is spread rather than de-spread, with means including a modulator for producing a plurality of modulation types each of which creates a distinct spread spectrum symbol with a given symbol sequence at the transmitter, wherein reception includes demodulation means for providing a "match" condition at the receiver to determine the data bit state, and means for determining the type of modulation impressed upon the received signal, the symbol sequence being known by the receiver and the collection of data bits forming a message, the receiver having in-phase (I) and quadrature (Q) detection means, and digital storage of complete signal formats which are subsequently compared (correlated) on a symbol-by-symbol basis with received signals of identical formats to determine if the result of each comparison will yield a binary "one" or "zero", all signal formats being Spread Spectrum (SS) with one data bit per symbol, wherein said demodulation method comprises the steps;

a) store data base of digitized reference signal formats using a modulated carrier at an intermediate frequency (IF);

b) down convert the received signal to IF, digitize and store; time multiplex the input to achieve real-time;

c) perform time alignment of the reference and the digitized received signal;

d) perform correlation to recover data, symbol-by-symbol, the result of the correlation being input to a threshold detector for a one or zero decision;

wherein the correlation process uses in-phase (I) and quadrature (Q) components of the received signal and the reference signal, wherein the correlation process is:

$$R_{sr}(\tau = 0) = \frac{1}{T}\left[\int_0^T I_r I_s dt + \int_0^T I_r Q_s dt - \int_0^T Q_r I_s dt + \int_0^T Q_r Q_s dt\right]$$

where:

| | |
|---|---|
| $S_s(t)$ | input signal |
| $S_r(t)$ | stored reference |
| $I_r$ | in phase component of reference signal |
| $I_s$ | in phase component of input signal |
| $O_r$ | quadrature component of reference signal |
| $O_s$ | quadrature component of input signal. |

* * * * *

UNITED STATES PATENT AND TRADEMARK OFFICE

CERTIFICATE OF CORRECTION

PATENT NO. : 5,031,192

DATED : July 9, 1991

INVENTOR(S) : Robert W. Clark

It is certified that error appears in the above-identified patent and that said Letters Patent is hereby corrected as shown below:

On the Title page

Abstract, line 4, a right parenthesis [ ) ] should follow "jamming".

Col 1, line 58, a period should follow "transmission".
Col 2, line 8, a period should follow "4,164,628".
Col 2, line 28, a colon should follow "spectrum".
Col 3, line 28, "(t))/$^2$" should read --(S(t))/$^2$--.
Col 3, line 34, a period should follow "symbol".
Col 3, line 39, a period should follow "real-time".
Col 3, line 40, an indent and --3.-- should precede "Perform".
Col 3, line 41, a period should follow "signal".
Col 4, line 60, a colon should follow "follows".
Col 5, line 9, a period should follow "mat".
Col 5, line 46, "Correlates" should be --Correlate--.
Col 5, line 66, the first occurrence of ")" should be --(--.
Col 6, line 22, a colon should follow "ing".
Col 6, line 24, a period should follow "loss".
Col 8, line 43, a new paragraph should begin at "FIG. 5".
Col 9, line 15, a period should follow "BWI".
Col 9, line 23, a period should follow "ratio".

UNITED STATES PATENT AND TRADEMARK OFFICE

CERTIFICATE OF CORRECTION

PATENT NO. : 5,031,192

DATED : July 9, 1991

INVENTOR(S) : Robert W. Clark

It is certified that error appears in the above-identified patent and that said Letters Patent is hereby corrected as shown below:

Col 10, line 15, a period should follow "1042".
Col 13, line 19, the following text should follow "circuit":
--1734,to a analog-to-digital converter 1735. The digital--.
Col 16, line 24, "$O_r$" should read --$Q_r$--.
Col 16, line 25, "$O_s$" should read --$Q_s$--.

Signed and Sealed this

Twenty-third Day of February, 1993

*Attest:*

STEPHEN G. KUNIN

*Attesting Officer*

*Acting Commissioner of Patents and Trademarks*